United States Patent [19]

Motonami et al.

[11] 4,262,932
[45] Apr. 21, 1981

[54] SEATBELT SYSTEM

[75] Inventors: Masanao Motonami; Jun Yasumatsu, both of Toyota; Tatsushi Kubota, Okazaki, all of Japan

[73] Assignee: Toyota Jidosha Kogyo Kabushiki Kaisha, Toyota, Japan

[21] Appl. No.: 64,740

[22] Filed: Aug. 8, 1979

[30] Foreign Application Priority Data

Dec. 4, 1978 [JP] Japan .......................... 53-168362[U]

[51] Int. Cl.³ ............................................. B60R 21/10
[52] U.S. Cl. ................................... 280/802; 280/806; 280/469
[58] Field of Search ............... 280/801, 802, 805, 806; 297/479, 468, 469, 472; 24/171, 172

[56] References Cited

U.S. PATENT DOCUMENTS

| 4,120,466 | 10/1978 | Ademeit | 280/806 X |
| 4,159,834 | 7/1979 | Miller et al. | 280/802 |

FOREIGN PATENT DOCUMENTS

| 2252356 | 10/1972 | Fed. Rep. of Germany | 280/802 |
| 2298456 | 8/1976 | France | 280/802 |

OTHER PUBLICATIONS

Research Disclosure, No. 129, p. 6, Industrial Opportunities Ltd., Hampshire, U.K., Jan. 1975.

*Primary Examiner*—John A. Pekar
*Attorney, Agent, or Firm*—Koda and Androlia

[57] ABSTRACT

Opposite ends of an outer webbing are engaged with the upper and lower portions of the door, one end of a webbing is wound up by a retractor provided at the central portion of the vehicle, the forward end of said webbing is slidable with the intermediate portion of the outer webbing, a first lock mechanism is provided at the intermediate portion of an inner webbing and a second lock mechanism is provided between the forward end portion of the inner webbing and the outer webbing, respectively, whereby one of the webbings is locked due to increased tensions in the webbings in an emergency of the vehicle, thereby positively restraining an occupant of the vehicle.

9 Claims, 10 Drawing Figures

SEATBELT SYSTEM

BACKGROUND OF THE INVENTION

1. Field of the Invention

This invention relates to a seatbelt system for protecting an occupant in an emergency of a vehicle, and particularly to a seatbelt system wherein consideration is given to improving the occupant restraining performance by directly locking the intermediate portion of webbings for restraining an occupant in an emergency of the vehicle.

2. Description of the Prior Art

In seatbelt systems, consideration has been given that webbings for restraining an occupant are fastened to the occupant, ends of said webbings are engaged with the vehicle, whereby the occupant is restrained in an emergency of the vehicle, so that the occupant can be protected from colliding with dangerous articles. Furthermore, to avoid obstructing the freedom for the occupant during normal running of the vehicle, ends of the webbings are secured to the vehicle through a retractor for winding up the webbings by a biasing force, and said retractor incorporates therein an inertia lock mechanism for preventing the wind-off of the webbings only in an emergency of the vehicle. Said inertia lock mechanism is constructed such that a ratchet wheel is solidly secured to a wind-up shaft for winding up the ends of the webbings, and a pawl actuated by an acceleration sensor is engaged with the ratchet wheel in an emergency of the vehicle, whereby the wind-up shaft is stopped in rotation, thus preventing the webbings from being wound off.

However, with the retractor of the type described, despite of the fact that the wind-off rotation of the wind-up shaft is stopped in an emergency of the vehicle, the webbings wound up to the wind-up shaft in layers are not stopped in wind-off until the webbings come in close contact with each other, i.e. the condition of loosely wound-up webbings takes place to unsatisfactorily restrain the occupant, so that safety of the occupant cannot be always secured.

The values of the webbings being tightened in the condition of loosely wound-up webbings tend to be increased in proportion as the values of the webbings being wound up are increased. In the passive seatbelt system in which the webbings are automatically fastened to the occupant after the occupant gets on the vehicle, the webbings are moved to a considerable extent during operation of automatical fastening of the webbings to the occupant, whereby the values of the webbings being wound up by the retractor are increased, thus the values of the webbings being tightened in the condition of loosely wound-up webbings being increased significantly.

SUMMARY OF THE INVENTION

In view of the above facts, one object of the present invention is to provide a seatbelt system capable of allowing the occupant to move freely during normal running condition of the vehicle and of positively restraining the occupant in an emergency of the vehicle.

In the seatbelt according to the present invention, locking mechanisms are provided at the intermediate portion of an inner webbing and at the connecting portion between the inner webbing and outer webbing, respectively, and said locking mechanisms are constructed such that the wind-off of the inner webbing from a retractor and the relative movement of the outer webbing with the inner webbing are prevented, respectively, only when tensions of the webbings are increased, so that the freedom of the occupant in movement may be secured during normal running condition of the vehicle and the occupant may be positively restrained in an emergency of the vehicle.

One embodiment of the present invention will now be described with reference to the drawings.

DESCRIPTION OF THE PREFERRED EMBODIMENT

Figure 1:
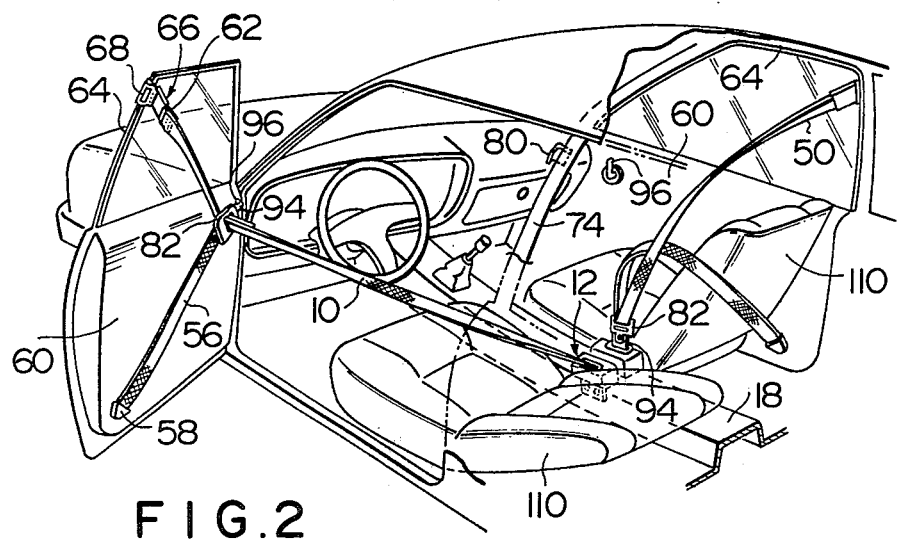
FIG. 1 is an oblique view showing one embodiment of the seatbelt system according to the present invention.
Figure 2:
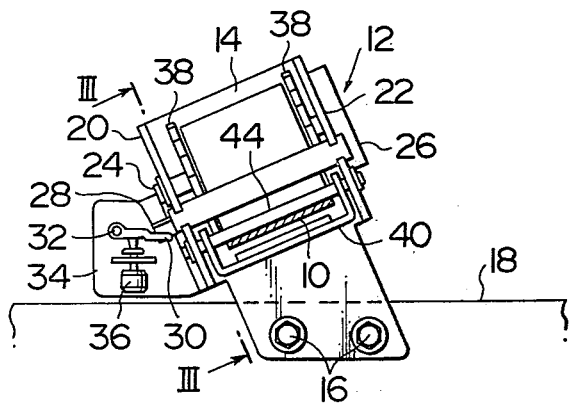
FIG. 2 is a front view showing the retractor illustrated in FIG. 1 (The cover being not shown)
Figure 3:
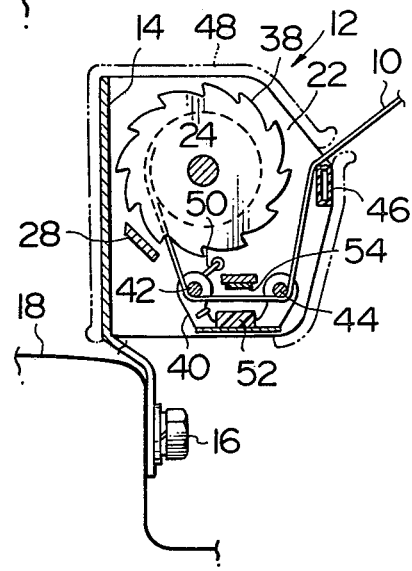
FIG. 3 is a cross-sectional view taken along the line III—III in FIG. 2.
Figure 4:
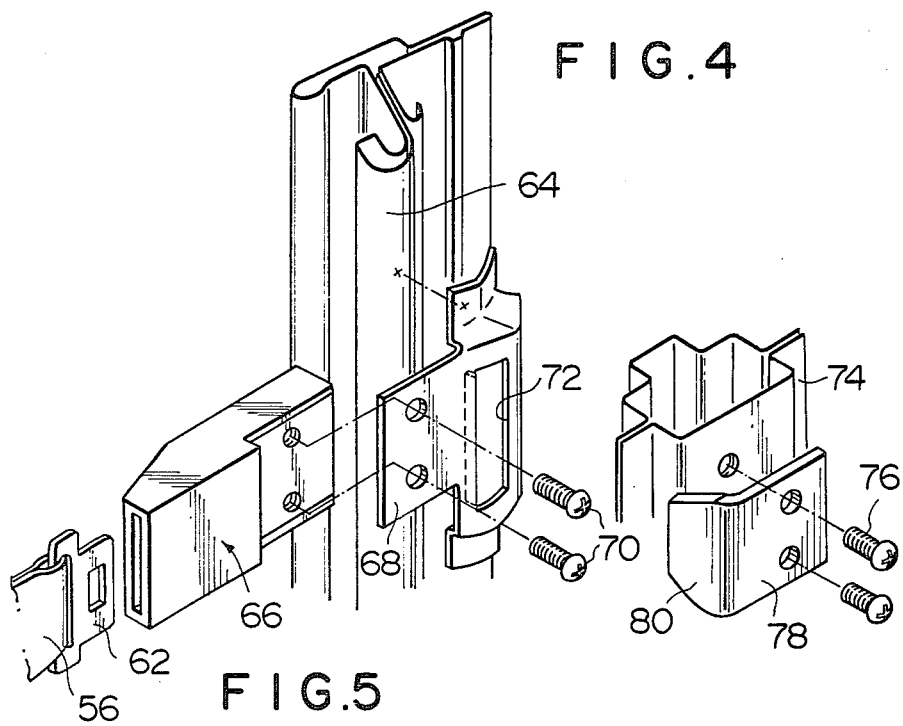
FIG. 4 is a disassembled oblique view showing the state of the buckle means being installed on the door.

As shown in FIG. 1, one end of an inner webbing 10 is wound up by a retractor 12 whose frame 14 is secured to a tunnel portion 18 provided at substantially central portion of the vehicle through mounting bolts 16 as shown in FIGS. 2 and 3.

Pivotally supported across parallel legs 20 and 22 formed on opposite sides of said frame 14 is a wind-up shaft 24 which winds up one end of a webbing 10 in layers. Said wind-up shaft 24 is biased in the wind-up direction of the webbing 10 by the biasing force of a spiral spring wind-up device 26 interposed between the wind-up shaft 24 and the parallel leg 22.

Furthermore, pivotally supported on the parallel legs 20 and 22 is a pawl 28, to one end of which is abutted the forward end of a lever 30. Said lever 30 is pivotally supported through a pin 32 on a bracket 34 projecting from the parallel leg 20 and rested on a pendulum 36 suspended from the bracket 34. As a result, the pawl 28 is separated from the ratchet wheel 38 secured to the wind-up shaft 24 by gravity as shown in FIG. 3 during normal running condition of the vehicle, but, when the pendulum 36 senses acceleration of the vehicle to be oscillated, the pawl 28 is pushed up by the lever 30 to mesh with the ratchet wheel 38 to thereby stop the rotation of the ratchet wheel 38 and the webbing wind-off rotation of the wind-up shaft 24.

A pivotal arm 40 is pivotally supported across said parallel legs 20 and 22 through a pivot 42 as shown in FIG. 3. Pivotally supported at the forward end of the pivotal arm 40 is a tension detecting pin 44 which is adapted to rotate about the pivot 42 in accordance with the pivotal movement of the pivotal arm 40. Here, the inner webbing 10 wound off the wind-up shaft 24 is wound round the pivot 42, thereafter, wound round said tension detecting pin 44, further, wound round a guide bar 46 racked across the parallel legs 20 and 22, and thereafter, led out of the retractor 12 through a dust cover 48.

A torsional coil spring 50 is spread between said pivotal arm 40 and the parallel leg 22, and said pivotal arm 40 is biased by said spring 50 in the clockwise direction in FIG. 3. Consequently, said pivotal arm 40 is adapted to swing against the biasing force of the spring 50 in the counterclockwise direction in FIG. 3 when tension of the webbing 10 exceeds a predetermined value. At the time of this swing, a frictional material 52 secured to the pivotal arm 40 clamps the webbing 10 in cooperation with a frictional material 54 racked across the parallel legs 20 and 22 to lock the intermediate portion of the webbing 10 to thereby prevent the webbing from moving in the longitudinal direction thereof.

Now, an outer webbing 56 shown in FIG. 1 is engaged at one end thereof to the lower portion of a door 60 for getting on or off the vehicle through an anchor plate 58 and engaged at the other end thereof with buckle means 66 installed on a window frame 64 of the door 60 through a tongue plate 62, whereby said outer webbing 56 is secured to the upper portion of the door 60.

Here, the buckle means 66 is provided thereon with a release button, not shown, capable of disengaging the tongue plate 62 as necessary, so that the occupant can escape to the outside of the vehicle in an emergency of the vehicle. Additionally, said buckle means 66 is adapted to be secured to a shoulder belt anchor 68 through mounting screws 70, and said shoulder belt anchor 68 is spot-welded to the window frame 64. Furthermore, said shoulder belt anchor 68 is penetratingly provided therein with a rectangular opening 72, through which a hook 80 of a shoulder anchor plate 78 secured to a center pillar 74 through screws 76 is inserted when the door 60 is closed. Said hook 80 extends in the crosswise direction of the vehicle, is adapted to transmit tension of the webbing 56 to the center pillar 74 through the rectangular opening 72 of the shoulder belt anchor 68 in an emergency of the vehicle so that tension of the webbing can be reliably supported in such a case.

Figure 5:
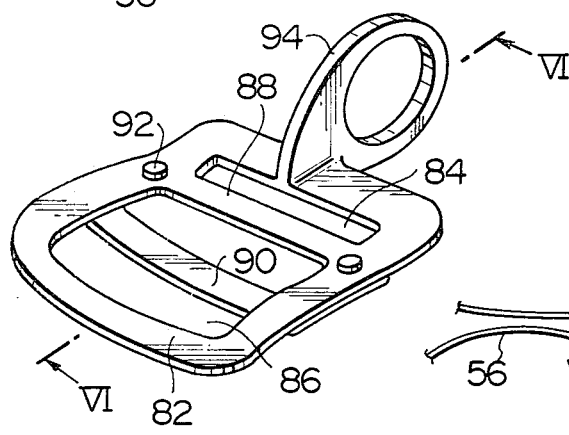
FIG. 5 is an oblique view showing the ring joint.

A ring joint 82 is secured to the other end of said inner webbing 10. Said ring joint 82 is thin plate-shaped as detailedly shown in FIG. 5, provided therein with two rectangular openings 84 and 86, and said rectangular openings are located adjacent to each other through a bar 88 for fixing the inner webbing.

Figure 6:
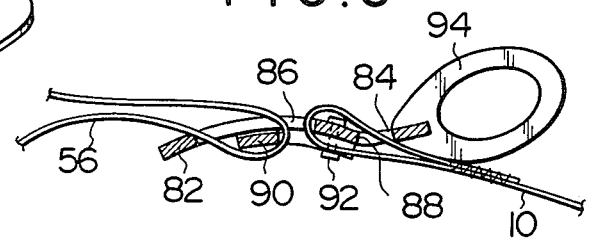
FIG. 6 is a cross-sectional view taken along the line VI—VI in FIG. 5.

As shown in FIG. 6, the forward end portion of the inner webbing 10 is wound round the bar 88 for fixing the inner webbing through the rectangular opening 84 and turned back, further passes the rectangular opening 86, and thereafter is sewn to be fixed. Consequently, the ring joint 82 is swingable relative to the forward end portion of the inner webbing 10.

Figure 7:
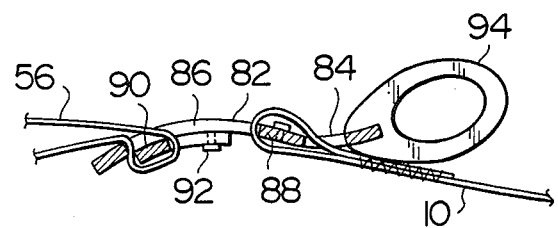
FIG. 7 is a working diagram of FIG. 6.

In addition, a locking bar 90 of substantially a letter 'U' shape in plan view is fixed at opposite forward ends thereof to said ring joint 82 through a pair of rivets 92. The central portion of said locking bar 90 is located at the substantially central portion of the rectangular opening 86. The outer webbing 56 is inserted into the rectangular opening 86 from the side other than that where said locking bar 90 is fixed, wound round the locking bar 90 and turned back, and thereafter, passes through the rectangular opening 86. As a result, the outer webbing 56 is freely movable sliding on the locking bar 90 as shown in FIG. 6 during normal running condition of the vehicle. However, when tension of the outer webbing 56 is increased, a large shearing force is exerted on the rivets 92 through the locking bar 90 to break the rivets 92. As shown in FIG. 7, the locking bar 90 which has become movable by the break of the rivets 92 is deviated to one side of the rectangular opening 86 to clamp the intermediate portion of the outer webbing 56 between itself and one side of the rectangular opening 86 for locking same, thereby preventing the movement of the outer webbing 56 in the longitudinal direction.

Figure 8:
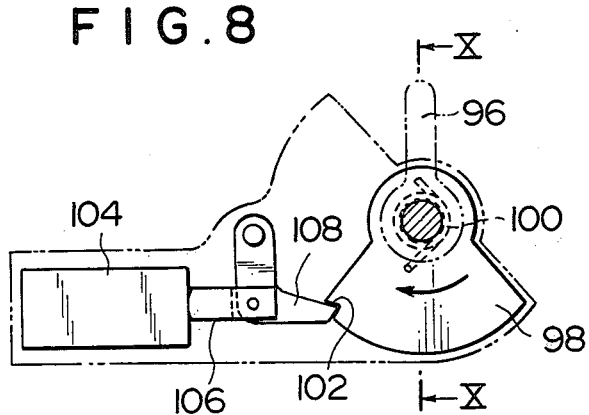
FIG. 8 is a cross-sectional view showing the state of the hook being mounted to the door.
Figure 9:
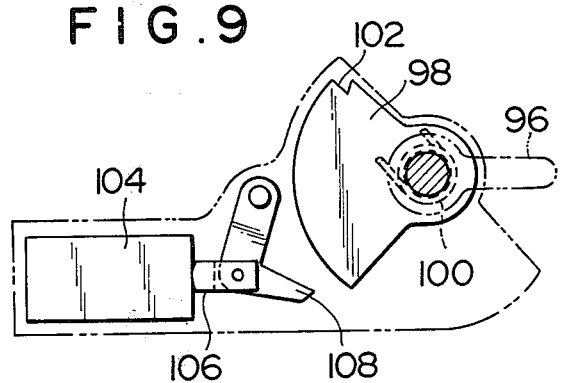
FIG. 9 is a working diagram of FIG. 8.
Figure 10:
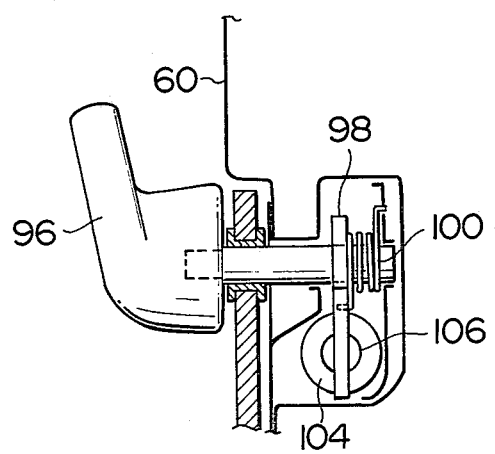
FIG. 10 is a cross-sectional view taken along the line X—X in FIG. 8.

Secured to said ring joint 82 is a ring 94 which can be suspended from a hook 96 projecting to a position adjacent the center of pivotal movement of the door 60 as shown in FIG. 1 when the occupant gets off the vehicle. As shown in FIGS. 8 and 9, said hook 96 is secured to a swingable frame 98 pivotally supported in the door 60 and projecting from the door toward the inside of the cabin. Said swingable frame 98 and hook 96 are biased by the biasing force of a torsional coil spring 100 interposed between the rotatable frame 98 and the door 60 in the counterclockwise direction in FIGS. 8 and 9 and stopped at a position where the hook is directed vertically upwardly.

A cutout 102 is cuttingly provided in the swingable frame 98. Said cutout 102 is adapted to be engaged with a stopper 108 driven by a plunger 106 of the solenoid 104. Said stopper 108 is adapted to detect the seated condition of the occupant to be disengaged from the cutout 102 of the swingable frame 98. For example, when the occupant closes the door after getting on the vehicle, the solenoid 104 is adapted to attract the plunger 106. Consequently, the occupant hangs the ring 94 of the ring joint on the hook 96, so that the webbings 10 and 56 can be deviated forwardly from the occupant to a considerable extent. Furthermore, when the door is closed after the occupant gets on the vehicle, the hook 96 comes to be swingable, whereby the wind-up biasing force of the retractor 12 causes, the webbing 10 to turn the hook 96 as shown in FIG. 9, so that the ring joint 82 can drop off the hook 96, thereby enabling to automatically fasten the webbing to the occupant.

Description will hereunder be given of action of the present embodiment of the arrangement as described above. FIG. 1 shows the condition where the driver of the vehicle opens the door for getting on the vehicle. In this condition, the ring 94 of the ring joint 82 is hung on the hook 96 as the occupant previously made so in the preceding time when he gets off the vehicle.

Consequently, a space sufficient for getting on or off the vehicle is formed between the webbings 10, 56 and the occupant's seat 110, so that the occupant can readily get on the vehicle.

When the occupant closes the door 60 upon being seated, the solenoid 104 attracts the plunger 106, whereby the stopper 108 is disengaged from the swingable frame 98, so that the hook 96 can be turned. Accordingly, the wind-up biasing force of the spiral spring wind-up device 26 is transmitted to the ring joint 84 through the inner webbing 10, and the hook 96 is turned against the biasing force of the torsional coil spring 100 as shown in FIG. 9

By this operation, the remaining portion of the inner webbing 10 is wound up by the wind-up shaft 24, whereby the ring joint 82 is moved to a position adjacent the retractor 12, so that a portion of the outer webbing 56 between the ring joint 82 and the buckle means 66 can be surroundingly attached to the shoulder of the occupant and a portion of the outer webbing 56 between the ring joint 82 and the anchor plate 58 to the waist of the occupant, thereby enabling to automatically fasten the three-point type seatbelt system to the occupant.

During normal running condition of the vehicle, the outer webbing 56 is freely movable relative to the ring joint 82, and the frictional material 52 of the pivotal arm 40 forms between itself and the frictional material 54 a space enough to allow the webbing 10 to move freely, so that the occupant can move freely. Further, it is possible for the occupant to freely change the fastened position by adjusting in length the portion of the outer webbing 56 attached to the shoulder and the portion of the outer webbing 56 attached to the waist.

Now, when the vehicle is fallen into an emergency such as a collision, the pendulum 36 is oscillated to mesh the pawl 28 with the ratchet wheel 38, whereby the wind-off rotation of the wind-up shaft 24 is suddenly stopped. Simultaneously with this, the occupant seated at a seat 110 is moved in the direction of collision to a large extent by the inertial force of collision, whereby high tensions take place in the webbings 10 and 56. Consequently, the tension detecting pin 44 of the pivotal arm 40 detects said tensions to be turned in the counterclockwise direction in FIG. 3, whereby the frictional material 52 is strongly pressed against the frictional material 54, so that the intermediate portion of the webbing 10 can be directly locked. Furthermore, at the same time, the tension of the outer webbing 56 break the rivets 92 to move the locking bar 90 as shown in FIG. 7, so that the outer webbing can be locked being clamped between the locking bar 90 and the ring joint 82.

The portion of the outer webbing 56 attached to the shoulder of the occupant and the portion of the outer webbing 56 attached to the waist become not adjustable in length as described above, whereby the inner webbing 10 is positively locked by the pivotal arm 40 to restrain the occupant, whereby the possibility of the occupant of running into the components in the cabin of the vehicle can be eliminated, thus enabling to secure the safety of the occupant.

Since the intermediate portion of the inner webbing 10 is directly locked by the pivotal arm 40 in the above case, the webbing 10 wound up by the wind-up shaft 24 is not wound up again due to the condition of loosely wound-up webbings, so that the occupant can obtain the same restrained condition as if he is fastened to with the webbings directly secured to the pivotal arm 40 and the upper and lower portions of the door 60, thereby enabling to expect to have positive restraining effects.

As has been described so far, the seatbelt system according to the present invention can present such excellent advantages that the intermediate portion of the webbing is directly locked, so that the occupant can move freely during normal running condition of the vehicle, and the occupant can be closely restrained to be secured in positive security in an emergency of the vehicle.

What is claimed is:

1. A seatbelt system for positively restraining an occupant by locking actions of a lock mechanism in an emergency of a vehicle, comprising:
   an outer webbing, opposite ends of which are secured to the upper and lower portions of a door respectively;
   a retractor secured to a substantially central portion of the vehicle;
   an inner webbing coupled at one end to said retractor and wound up by a biasing force of said retractor;
   an acceleration sensor for locking a wind-off of said inner webbing in an emergency of the vehicle provided in said retractor;
   a first lock mechanism for directly locking an intermediate portion of said inner webbing when tension of said inner webbing exceeds a predetermined amount;
   a ring joint secured to the other end of said inner webbing and guiding an outer webbing in a manner that said inner webbing can be moved in the longitudinal direction thereof;
   a second locking mechanism provided on said ring joint for preventing said movement of the outer webbing when tension of said outer webbing exceeds a predetermined amount; and
   a hook provided on said door for engaging said ring joint.

2. A seatbelt system as set forth in claim 1, wherein said first lock mechanism is secured to said retractor.

3. A seatbelt system as set forth in claim 1, wherein said first lock mechanism locks the intermediate portion of the webbing by clamping same between a pair of frictional materials.

4. A seatbelt system as set forth in claim 3, wherein one of the pair of frictional materials is secured to the retractor and the other to a pivotal arm pivotally supported on the retractor.

5. A seatbelt system as set forth in claim 4, wherein said pivotal arm is provided at the forward end thereof with a tension detecting pin, round which the intermediate portion of webbing is wound.

6. A seatbelt system as set forth in claim 1, wherein said outer webbing is secured at one end to the door through a tongue plate and buckle means.

7. A seatbelt system as set forth in claim 6, wherein said buckle means is secured to a window frame of the door through a shoulder belt anchor, and a hook projecting from a center pillar is inserted into an opening provided in said shoulder anchor when the door is closed, so that tension of the webbing can be transmitted to the center pillar in an emergency of the vehicle.

8. A seatbelt system for positively restraining an occupant by locking actions of a lock mechanism in an emergency of a vehicle, comprising:
   an outer webbing, opposite ends of which are secured to the upper and lower portions of a door respectively;
   a retractor secured to a substantially central portion of the vehicle;
   an inner webbing coupled at one end to said retractor wound up by biasing force of said retractor;
   an acceleration sensor for locking a wind-off of said inner webbing in an emergency of the vehicle provided in said retractor;
   a first lock mechanism for directly locking an intermediate portion of said inner webbing when tension of said inner webbing exceeds a predetermined amount; and
   a ring joint secured to the other end of said inner webbing and guiding an outer webbing in a manner that said inner webbing can be moved in the longitudinal direction thereof, said ring joint being provided therein with a first opening, a locking bar secured to one side of said ring joint by rivets and dividing said first opening into second and third openings; the outer webbing is inserted into said second opening from the other side thereof, an intermediate portion of said outer webbing is wound around said locking bar and turned back again and passes through said third opening and extends to the other side, whereby a second lock mechanism is provided wherein said rivets can be broken by tension of the outer webbing in an emergency of the vehicle, thus enabling the locking bar to clamp the outer webbing between itself and said first opening to lock same.

9. A seatbelt system comprising:

an outer webbing connected to one end to the lower portion of the door and at the other end to the upper portion of the door through a tongue plate and buckle means;

a retractor secured to the substantially central portion of the vehicle;

an inner webbing, one end of which is wound up by said retractor by a biasing force;

a pendulum provided on said retractor for locking the wind-off of the inner webbing in an emergency of the vehicle;

a first lock mechanism mounted on said retractor, said lock mechanism being provided with a frictional material secured to a pivotal arm for pivotally moving when tensions of the webbings exceeds a predetermined amount and with a frictional material for clamping the inner webbing between itself and said frictional material;

a ring joint secured to the other end of said inner webbing; and a second lock mechanism provided between said ring joint and said outer webbing, said second lock mechanism comprising an opening formed in said ring joint and a locking bar secured to one side of said ring joint through rivets and dividing said opening into two openings, the intermediate portion of said outer webbing being inserted through one of the two openings, wound round on said locking bar and turned back through the other of the two opening, tensions of the outer webbing being adapted to break said rivets of said locking bar, and the intermediate portion of said outer webbing being clamped between said locking bar and an end portion of said opening to be locked.

* * * * *